(12) United States Patent
Ueda et al.

(10) Patent No.: US 10,310,931 B2
(45) Date of Patent: Jun. 4, 2019

(54) COMMUNICATIONS STATE ESTIMATION DEVICE, COMMUNICATIONS STATE ESTIMATION METHOD, AND STORAGE MEDIUM THAT STORES COMMUNICATIONS STATE ESTIMATION PROGRAM

(71) Applicant: NEC Corporation, Minato-ku, Tokyo (JP)

(72) Inventors: Hirofumi Ueda, Tokyo (JP); Shunichi Kinoshita, Tokyo (JP); Norio Yamagaki, Tokyo (JP); Kazumine Ogura, Tokyo (JP); Norihito Fujita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 191 days.

(21) Appl. No.: 15/318,799

(22) PCT Filed: Jun. 11, 2015

(86) PCT No.: PCT/JP2015/002925
§ 371 (c)(1),
(2) Date: Dec. 14, 2016

(87) PCT Pub. No.: WO2015/194134
PCT Pub. Date: Dec. 23, 2015

(65) Prior Publication Data
US 2017/0116063 A1    Apr. 27, 2017

(30) Foreign Application Priority Data

Jun. 18, 2014   (JP) ................................ 2014-124982

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0709* (2013.01); *G06F 11/0751* (2013.01);
(Continued)

(58) Field of Classification Search
CPC ..................................................... G06F 11/079
See application file for complete search history.

(56) References Cited

U.S. PATENT DOCUMENTS 5,057,938 A * 10/1991 Edamura ............ H04N 1/32619
                                                           333/101
7,623,879 B2    11/2009 Honkanen et al.
(Continued)

FOREIGN PATENT DOCUMENTS

JP    2008-521309 A    6/2008
JP    2010-136291 A    6/2010
(Continued)

OTHER PUBLICATIONS

International Search Report for PCT Application No. PCT/JP2015/002925, dated Jul. 21, 2015.
(Continued)

*Primary Examiner* — Christopher S McCarthy

(57) ABSTRACT

Provided are a communications state determination device, etc., capable of improving the accuracy of network state specification. This communications state estimation device comprises: a setting means that, in accordance with given communications parameters, applies the communications parameters to a communications device that determines the occurrence of communications errors in communications with a communications destination device; a detection means that sends communications instructions to the communications device that performs communications, in accordance with received communications instructions, and detects the occurrence of communications errors that have
(Continued)

been determined in the communications that are in accordance with the instructions; and an estimation means that estimates whether or not the communications device can perform the communications, on the basis of the communications parameters and the existence or otherwise of communications errors.

8 Claims, 11 Drawing Sheets

(51) Int. Cl.
  *H04L 29/06*  (2006.01)
  *H04W 24/06*  (2009.01)
  *H04W 24/08*  (2009.01)
  *H04L 1/00*  (2006.01)
  *H04L 1/18*  (2006.01)
  *H04W 24/04*  (2009.01)

(52) U.S. Cl.
  CPC ............... *H04L 1/00* (2013.01); *H04L 29/06* (2013.01); *H04L 69/163* (2013.01); *H04W 24/06* (2013.01); *H04W 24/08* (2013.01); *H04L 1/1874* (2013.01); *H04L 1/1887* (2013.01); *H04W 24/04* (2013.01)

(56) References Cited

U.S. PATENT DOCUMENTS

| | | |
|---|---|---|
| 8,594,033 B2 | 11/2013 | Altintas et al. |
| 8,838,040 B2 | 9/2014 | Wellington |
| 2003/0134621 A1* | 7/2003 | Yabe ..................... H04L 51/24 455/413 |
| 2006/0242672 A1* | 10/2006 | Narayanan ............. H04N 7/165 725/86 |
| 2009/0100297 A1* | 4/2009 | Srinivasan ............ G06F 11/277 714/43 |
| 2010/0029215 A1 | 2/2010 | Honkanen et al. |
| 2010/0124887 A1 | 5/2010 | Wellington |
| 2010/0290420 A1* | 11/2010 | Dalsgaard ............. H04L 5/0044 370/329 |
| 2011/0078531 A1* | 3/2011 | Umeda .................. H04L 1/0016 714/751 |
| 2011/0176508 A1 | 7/2011 | Altintas et al. |
| 2013/0332996 A1* | 12/2013 | Fiala ..................... H04L 63/083 726/4 |
| 2014/0146677 A1* | 5/2014 | Howes .................. H04L 47/22 370/235 |
| 2017/0310572 A1* | 10/2017 | Yi ........................... H04L 43/08 |

FOREIGN PATENT DOCUMENTS

| | | |
|---|---|---|
| JP | 4754416 B2 | 8/2011 |
| JP | 2012-509647 A | 4/2012 |
| JP | 2013-066126 A | 4/2013 |
| WO | 2014/076878 A1 | 5/2014 |

OTHER PUBLICATIONS

English translation of Written opinion for PCT Application No. PCT/JP2015/002925.

* cited by examiner

Fig. 2

| NUMBER OF SYN RETRANSMISSIONS (TIMES) | BACKOFF PERIOD (SECONDS) | COMMUNICATION ERROR PROBABILITY (%) |
|---|---|---|
| 1 | 3 | 90 |
| 2 | 6 | 40 |
| 3 | 12 | 20 |
| 4 | 24 | 5 |
| 5 | 48 | 0 |

COMMUNICATIONS STATE ESTIMATION DEVICE, COMMUNICATIONS STATE ESTIMATION METHOD, AND STORAGE MEDIUM THAT STORES COMMUNICATIONS STATE ESTIMATION PROGRAM

This application is a National Stage Entry of PCT/JP2015/002925 filed on Jun. 11, 2015, which claims priority from Japanese Patent Application 2014-124982 filed on Jun. 18, 2014, the contents of all of which are incorporated herein by reference, in their entirety.

TECHNICAL FIELD

The present invention relates to a technique for estimating communication environments.

BACKGROUND ART

In recent years, for example, as a communication means of inter-vehicle communication, communication in an isolated district with no network infrastructure, and a communication means at the time of disaster, mobile ad-hoc networks (MANET) have been spotlighted. In the MANET, a number of communication terminals (nodes) are desired to be wirelessly connected to one another.

In the MANET, movement and wireless connections of communication terminals are assumed. Therefore, due to the movement of the communication terminals and wireless interference, there may occur a failure such as loss of packets (communication data), an increase in communication delay, and communication interruption. In such a case, existing communication protocols do not operate well.

For example, Transmission Control Protocol (TCP) is a communication protocol commonly used in wired environments. TCP is called a connection-oriented protocol. TCP has characteristics, for example, in performing establishment of communication sessions, control of communication speeds, and retransmission control of packets. When TCP is used in a MANET environment, it is well known that communication is not smooth due to packet loss and communication interruption which occur at a high probability.

An example of a technique for avoiding such a state in which communication is not smooth is disclosed in PTL 1. A wireless communication device disclosed in PTL 1 monitors a window size of TCP. When determining that a congestion state has occurred, the wireless communication device uses UDP (User Datagram Protocol) which is another communication protocol. PTL 1 also discloses a method for continuing communication by performing TCP communication and UDP communication in parallel.

PTL 2 discloses a communication device that controls wireless connection parameters so that interference among a plurality of simultaneous wireless connections is reduced.

PTL 3 discloses a communication system that selects transmission parameters on the basis of estimated throughput. The communication system obtains the estimated throughput on the basis of an estimation error rate and a data transmission rate.

CITATION LIST

Patent Literature

[PTL 1] Japanese Patent No. 4754416
[PTL 2] Japanese Unexamined Patent Application Publication (Translation of PCT Application) No. 2008-521309
[PTL 3] Japanese Unexamined Patent Application Publication (Translation of PCT Application) No. 2012-509647

SUMMARY OF INVENTION

Technical Problem

In passing-each-other communication such as inter-vehicle communication and in an environment in which communication links are frequently interrupted, packets may not be delivered for a while. In such a case, the performance of TCP communication is reduced by non-delivery of packets. In addition, in the TCP communication, a problem occurs in packet retransmission control.

For example, at the time of start and at the time of reconnection of TCP-based communication, Synchronize (SYN) packets are exchanged. In the exchange of the SYN packets, when communication interruption or packet loss occurs, retransmission control of the SYN packets is started. At this time, a retransmission wait time is provided. The retransmission wait time is also generally called a backoff time. The backoff time is provided, so that the retransmission of the SYN packets is not immediately performed. Therefore, communication is not started until at least the backoff time ends.

FIG. 10 is a diagram schematically illustrating an example of inter-vehicle communication. In the example illustrated in FIG. 10, a node A is a communication terminal mounted on a vehicle running on a road. A node B is a communication terminal mounted on a vehicle running on an opposite lane of a lane on which the vehicle carrying the node A is running. In the example illustrated in FIG. 10, a time lapses in sequence of a time T1, a time T2, and a time T3. At the time T1, the node A and the node B start processing of establishing a session. However, when loss of a SYN packet for establishing the session occurs, a backoff period is set. In the example illustrated in FIG. 10, loss of a SYN packet occurs between the time T1 and the time T2. Then, at the time T2, a SYN backoff period, during which communication is disabled, is started. After the backoff period ends, the processing of establishing the session is performed again. In the example illustrated in FIG. 10, at the time T3, establishing a TCP connection is completed. However, since the two vehicles can continuously run in opposite directions during the backoff period, when establishing the connection is completed, a distance between the two vehicles may have increased as in the example illustrated in FIG. 10.

After TCP communication is started, when a communication link is interrupted, retransmission of data packets is started. At that time, a backoff time is provided in a similar manner. Until the backoff time ends, no packet retransmission is performed. The backoff time is provided, so that communication is disabled for a while, even after a communication link is recovered, until the backoff time ends.

FIG. 11 is a diagram schematically illustrating an example of communication performed between two communication terminals. In FIG. 11, operations performed by the two communication terminals are drawn downward from the top according to the passage of time. In the example illustrated in FIG. 11, a node A transmits data to a node B in response to a request from the node B. The request from the node B, for example, is a content request for requiring content. In such a case, the data transmitted from the node A to the node B is the requested content. When communication interruption occurs between the node A and the node B during the data transmission, the node A retransmits a data packet. When the retransmission fails, the node A retransmits the data packet after a provided backoff period ends. The backoff period, for example, exponentially increases according to an increase in the number of retransmissions. In the example illustrated in FIG. 11, all the retransmissions of data packets, which are performed during the communication interruption for three times, fails. After the third retransmission, the communication interruption is resolved. When the communication interruption is resolved, if the backoff time, during which communication is disabled, is not set, communication is enabled. However, until a backoff period provided due to the failure of the third retransmission ends, the node A is not able to perform retransmission of data packets. The "retransmission wait time" in FIG. 11 corresponds to a time for which the node A is not able to perform retransmission of data packets due to the provided backoff period.

In the aforementioned case, in order to shorten a time until communication is enabled, when packet loss occurs at the time of exchange of SYN packets, a TCP reconnection may be performed early after a communication link is stabilized. When a communication link is interrupted after communication is started, retransmission may be quickly performed after the communication link is recovered.

The backoff time is a wait time at the time of a normal operation. The generation of the backoff period in a communication device that relays communication is not notified, for example, as an error to an information processing apparatus, such as a processor executing an application program and the like, which communicates with another apparatus via the communication device. Therefore, the information processing apparatus, which performs communication via the communication device, is not able to detect a time for which communication is disabled because of the backoff period which is set. Accordingly, although the backoff period is set, the information processing apparatus recognizes the communication to be normally performed.

As described above, in the case of performing communication by a communication protocol having the backoff period of a communication device, another apparatus using the communication device is not able to accurately determine whether the communication device is in a state in which communication is enabled.

In such a case, there is a possibility that the information processing apparatus transmits data to the other apparatus via the communication device in the backoff period. In such a case, for example, a buffer of the communication device is overflowed, so that the transmitted data may be lost.

The wireless communication device disclosed in PTL 1 uses UDP communication together with TCP communication when an error occurs in the TCP communication. However, since the backoff period is a wait period, it is not abnormal that data is not transmitted in the backoff period. Accordingly, an apparatus and the like that perform communication via the wireless communication device disclosed in PTL 1 are not able to detect that communication fails due to the backoff period.

The communication device disclosed in PTL 2 determines whether a plurality of wireless connections interfere with each other. However, an apparatus and the like that perform communication via the communication device of PTL 2 are not able to detect that communication fails due to the backoff period.

The communication system disclosed in PTL 3 selects transmission parameters on the basis of estimated throughput. However, an apparatus and the like that perform communication via the communication system of PTL 3 are not able to detect that communication fails due to the backoff period.

One of the objects of the present invention is to provide a communication state determination device and the like capable of improving accuracy in specifying the state of a network.

Solution to Problem

A communication state estimation device according to an aspect of the present invention includes: setting means for assigning a communication parameter to a communication device that determines occurrence of a communication error in communication with a communication destination device based on the communication parameter assigned; detection means for transmitting a communication instruction to the communication device that performs the communication upon reception of the communication instruction, and detecting occurrence of a communication error determined in the communication that is performed in response to the instruction; and estimation means for estimating whether the communication device is able to perform the communication, on a basis of the communication parameter and presence or absence of the occurrence of the communication error.

A communication state estimation method according to an aspect of the present invention includes: assigning a communication parameter to a communication device that determines occurrence of a communication error in communication with a communication destination device based on the communication parameter assigned; transmitting a communication instruction to the communication device that performs the communication upon reception of the communication instruction, and detecting occurrence of a communication error determined in the communication that is performed in response to the instruction; and estimating whether the communication device is able to perform the communication, on a basis of the communication parameter and presence or absence of the occurrence of the communication error.

A storage medium that stores a communication state estimation program according to an aspect of the present invention causes a computer to operate as: setting means for assigning a communication parameter to a communication device that determines occurrence of a communication error in communication with a communication destination device based on the communication parameter assigned; detection means for transmitting a communication instruction to the communication device that performs the communication upon reception of the communication instruction, and detecting occurrence of a communication error determined in the communication that is performed in response to the instruction; and estimation means for performing estimation whether the communication device is able to perform the communication, on a basis of the communication parameter and presence or absence of the occurrence of the communication error.

Advantageous Effects of Invention

The present invention has an effect of enabling improvement of accuracy in specifying the state of a network.

BRIEF DESCRIPTION OF DRAWINGS

FIG. 2 is a diagram schematically illustrating an example of a occurrence probability of communication errors calculated for a plurality of different communication parameters.

DESCRIPTION OF EMBODIMENTS

Next, example embodiments of the present invention are described in detail with reference to the drawings.

First Example Embodiment

[Description of Configuration]

Figure 1:
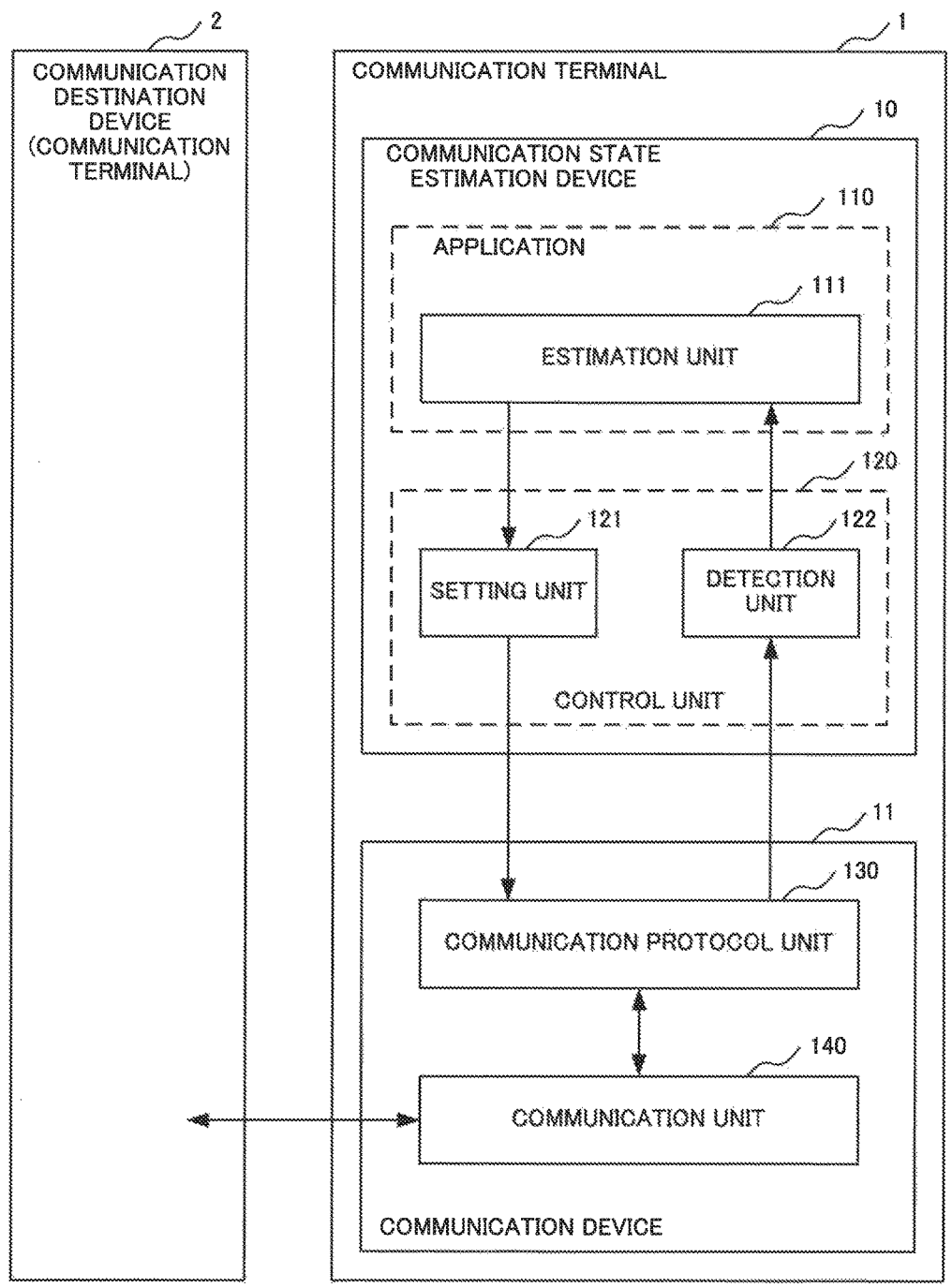
FIG. 1 is a block diagram illustrating an example of a configuration of a communication terminal 1 of first and second example embodiments of the present invention.

FIG. 1 is a block diagram illustrating an example of a configuration of a communication terminal 1 of the present example embodiment. The communication terminal 1 is communicably connected to a communication destination device 2. The communication terminal 1 and the communication destination device 2 may communicate with each other in, for example, a wireless manner. The communication destination device 2 is, for example, a communication terminal having the same configuration as that of the communication terminal 1.

Referring to FIG. 1, the communication terminal 1 of the present example embodiment includes an estimation unit 111, a setting unit 121, a detection unit 122, a communication protocol unit 130, and a communication unit 140. In the example illustrated in FIG. 1, the communication terminal 1 includes a communication state estimation device 10 and a communication device 11. The communication state estimation device 10 includes the estimation unit 111, the setting unit 121, and the detection unit 122. The communication device 11 includes the communication protocol unit 130 and the communication unit 140. The estimation unit 111 is achieved, for example, by a processor of the communication state estimation device 10 and an application 110, which is an application program executed by the processor of the communication state estimation device 10. A processor of the communication terminal 1 may be the processor of the communication state estimation device 10. The setting unit 121 and the detection unit 122 are implemented as a control unit 120. The communication unit 140 communicates with, for example, another communication terminal such as the communication destination device 2. The communication protocol unit 130 controls communication according to a predetermined communication protocol. The control unit 120 is an interface between the communication device 11 and the application 110.

The communication unit 140 sends data, which is received from the communication protocol unit 130, to another communication terminal such as the communication destination device 2. Moreover, the communication unit 140 transmits data, which is received from the other communication terminal, to the communication protocol unit 130.

The communication protocol unit 130 sends/receives data through the communication unit 140. The communication protocol unit 130 establishes a communication session with the other communication terminal. The communication protocol unit 130 controls a transmission speed. The communication protocol unit 130 performs retransmission control of transmitted data. Furthermore, when performing retransmission control more than a certain number of times, when failing to establish a communication session within a certain period of time, and when failing to receive data for a certain period of time, the communication protocol unit 130 determines that a communication error has occurred. When determining that the communication error has occurred, the communication protocol unit 130 transmits the content of the aforementioned error to the detection unit 122. Furthermore, the communication protocol unit 130 stores communication parameters specifying the above-mentioned certain number of times and certain period of time. The communication parameter is set by, for example, the setting unit 121. The communication protocol unit 130 may, for example, receive the communication parameter from the setting unit 121 and store the received communication parameter. The setting unit 121 may alternatively write the communication parameter in a storage area which is included in the communication protocol unit 130 and which stores communication parameters. Then, the communication protocol unit 130 performs communication in accordance with the stored communication parameters.

A communication protocol on which the communication protocol unit 130 is based is, for example, TCP. In the following description, the communication protocol on which the communication protocol unit 130 is based is TCP. When TCP is used, the communication protocol unit 130 determines, on the basis of the number of retransmissions of a SYN packet, whether a communication session is established within a certain period of time. For example, when the number of retransmissions exceeds the maximum value of retransmissions, the communication protocol unit 130 determines that the session establishment fails. The above-mentioned certain period of time is, for example, a value set for TCP_USER_TIMEOUT which is a variable. When failing to receive a packet within a time set for the TCP_USER_TIMEOUT, the communication protocol unit 130 determines that a communication error occurs. Those values are set by, for example, changing TCP communication parameters in a socket option.

For example, when a TCP system call such as bind( ), connect( ), read( ) and the like is executed, if an error occurs, the communication protocol unit 130 may transmit error information.

Moreover, when it is not possible to transmit/receive a control message (for example, a TCP SYN packet) of a communication protocol, the communication protocol unit 130 may determine that a communication error has occurred. When a specific control message has been received from a communication partner, the communication protocol unit 130 may determine that a communication error has occurred. In the following description, the determination by the communication protocol unit 130 that a communication error has occurred is referred to as "a communication error occurs in the communication protocol unit 130".

The setting unit 121 sets the communication parameters of the communication protocol unit 130. The setting unit 121 receives information of the communication parameters from the estimation unit 111. The setting unit 121 transmits the received communication parameters to the communication protocol unit 130. The setting unit 121 writes the received communication parameter in the storage area which stores communication parameters and is included in the communication protocol unit 130. Then, the setting unit 121 instructs the communication protocol unit 130 to start communication. For example, when TCP is used, the setting unit 121 sets, by using a socket option, the parameters notified by the estimation unit 111. The setting unit 121 instructs the communication protocol unit 130 to start processing of establishing a session with a communication partner. For example, the setting unit 121 may transmit an instruction to start processing of establishing a session with the communication partner to the communication protocol unit 130. When the instruction is received, the communication protocol unit 130 may start processing of establishing a session with the communication partner.

The detection unit 122 monitors the presence or absence of a communication error in communication with a communication partner. The detection unit 122 may detect the occurrence of the communication error in the communication with the communication partner. The detection unit 122 may detect whether the communication protocol unit 130 determines that the communication error occurs. For example, when receiving communication error information, which is transmitted by the communication protocol unit 130 when the communication error occurs and which represents the occurred communication error, the detection unit 122 may detect the occurrence of the communication error. The detection unit 122 notifies the estimation unit 111 of the occurrence of the communication error, for example, by transmitting the received communication error information. For example, when TCP is used, the setting unit 121 sets, for example, the number of retransmissions of a SYN packet as a communication parameter. In this case, the communication protocol unit 130 determines that failure in session establishment is the communication error that occurs. When determining that the communication error occurs, the communication protocol unit 130 transmits, to the detection unit 122, error information represents the failure in session establishment. The detection unit 122 notifies the estimation unit 111 that the session establishment fails. That is, the detection unit 122 transmits, to the estimation unit 111, a communication error representing the failure in session establishment.

When the session establishment succeeds, the communication protocol unit 130 may transmit a message representing the success in session establishment to the detection unit 122. When receiving the message representing the success in session establishment, the detection unit 122 may transmit the message representing the success in session establishment to the estimation unit 111.

As a threshold value to be used for determining the occurrence of a communication error when failing to receive a packet for more than the certain period of time a period is set, for example, for the TCP_USER_TIMEOUT as described above. In this case, when no packet is received within a period equal to or more than the period set for the TCP_USER_TIMEOUT after a session is established, the communication protocol unit 130 determines that a communication error occurs. In this case, the communication protocol unit 130 transmits, to the detection unit 122, communication error information indicating that no packet is received for a certain period of time. The detection unit 122 notifies the estimation unit 111 that no packet is received for a certain period of time.

For example, in the case where TCP is used as a communication protocol, when a TCP system call such as bind( ), connect( ), read( ) and the like is executed, if a communication error occurs, the communication protocol unit 130 may transmit the communication error information. In this case, the detection unit 122 may execute a TCP system call. When any of the TCP system calls is executed, the detection unit 122 may monitor whether a TCP communication error occurs. When occurrence of a communication error is detected, the detection unit 122 may notify the estimation unit 111.

When another communication error is detected, the detection unit 122 notifies the estimation unit 111 in a similar manner.

As described above, the estimation unit 111 may be achieved by, for example, the application 110, which is an application program executed by a processor of the communication terminal 1 or the communication state estimation device 10.

The estimation unit 111 sets communication parameters based on a communication error to be inspected as communication parameters of the communication protocol unit 130 by using the setting unit 121. On the basis of the presence or absence of the occurrence of a communication error, which is notified by the detection unit 122, and the content of the communication parameters that are set, the estimation unit 111 estimates a communication establishment situation.

For example, when the difficulty in session establishment of TCP communication is a determination target, the estimation unit 111 transmits, to the setting unit 121, a request to set, for example, the number of retransmissions of the SYN packet, which is one of communication parameters, to one. Moreover, the estimation unit 111 transmits, to the setting unit 121, a request to perform communication in a state in which the number of retransmissions of the SYN packet is set to 1. The estimation unit 111 receives a communication error, which occurs in the communication performed in response to the request, from the detection unit 122. In the following description, transmitting a request to perform communication in a state in which a communication parameter is set and receiving a communication error when a communication error occurs in the communication referred to as "inspection". The estimation unit 111 determines, on the basis of the received communication error, whether session establishment is easy or difficult. The estimation unit 111 may repeat, for a preset number of times, for example, a request to perform communication in a state in which the number of retransmissions of the SYN packet is set for an inspection. In a state in which the number of retransmissions of the SYN packet is set to one, when the communication protocol unit 130 successively fails in session establishment, a communication error representing a failure in the establishment is successively transmitted from the detection unit 122. Therefore, when the estimation unit 111 successively receives the communication error representing failure of session establishment from the detection unit 122, the estimation unit 111 determines that session establishment is difficult. Even in the state in which the number of retransmissions of the SYN packet is set to one, when the communication protocol unit 130 does not successively fail in session establishment, communication error representing failure of session establishment is not successively transmitted from the detection unit 122. For example, when a communication error is not successively received from the detection unit 122, the estimation unit 111 may determine that session establishment is easy. In this case, the estimation unit 111 may estimate that communication with the communication destination device 2 is enabled. The estimation unit 111 may repeat determination as to whether session establishment is difficult or easy, which is described above.

While the session establishment is determined to be difficult, the communication terminal 1 may not actually attempt establishment of communication for performing data transmission. For example, when the result of determination regarding the difficulty of the session establishment changes from difficult to easy, the application 110, for example, may actually start TCP communication for performing data transmission. By doing so, the communication state estimation device 10 can shorten a backoff time in a process of establishing communication, thereby making it possible to start the TCP communication early.

Furthermore, the estimation unit 111 may repeated the aforementioned inspection by using only a specific communication parameter. The estimation unit 111 may repeated the inspection while variously changing the communication parameters. Moreover, the estimation unit 111 may calculate a probability that a communication error is received for each communication parameter subjected to the inspection. For example, the estimation unit 111 may repeat the inspection with one value of a communication parameter for a plurality of times. On the basis of results of the inspection performed for a plurality of times, the estimation unit 111 may calculate an occurrence probability of a communication error. Similarly, the estimation unit 111 may calculate an occurrence probability of a communication error with each of other communication parameters.

The estimation unit 111 may transmit an instruction to set a value larger than one as the number of retransmissions of the SYN packet to the setting unit 121. When session establishment of succeeds, the detection unit 122 may transmit, to the estimation unit 111, the number of retransmissions of the SYN packet until a session is established. When session establishment fails, the detection unit 122 may transmit a communication error representing a failure in the session establishment to the estimation unit 111. On the basis of the received number of retransmissions, the estimation unit 111 may calculate a communication error separately for each of the numbers of retransmissions of the SYN packet.

FIG. 2 is a diagram schematically illustrating an example of communication error occurrence probabilities calculated for a plurality of different communication parameters. In FIG. 2, the "communication error probability" represents a probability that session establishment fails when a SYN packet can be retransmitted at most the number of times represented by the "number of SYN retransmissions". The example illustrated in FIG. 2 shows, for example, a probability that session establishment fails even when the SYN packet is retransmitted three times is 20%. The "backoff period" represents a backoff period in a case where the number of retransmissions of the SYN packet is the number of times represented by the "number of SYN retransmissions". For example, a backoff period for the first retransmission of the SYN packet is three seconds. A backoff period for the second retransmission of the SYN packet is six seconds. A backoff period for the third retransmission of the SYN packet is twelve seconds. The sum of the backoff periods when the SYN packet is retransmitted three times is 21 seconds (three seconds+six seconds+twelve seconds).

The estimation unit 111 may determine, on the basis of the communication error probability, whether session establishment is enabled. The estimation unit 111 may specify the minimum number of retransmissions of the SYN packet in a case where the communication error probability is equal to or less than a threshold value. The estimation unit 111 may calculate, as a wait time, the sum of backoff times in a case where the number of retransmissions of the SYN packet is the specified number of retransmissions of the SYN packet. For example, when the calculated wait time does not exceed a predetermined threshold value, the estimation unit 111 may estimate that communication is enabled. For example, when the calculated wait time exceed the predetermined threshold value, the estimation unit 111 may estimate that communication is not enabled. For example, when a threshold value of determination as to whether session establishment is enabled is 20%, the minimum number of SYN retransmissions in a case where the communication error probability is equal to or less than 20% is three. In this case, the estimation unit 111 may estimate that session establishment is enabled by retransmitting a SYN packet three times. Moreover, the estimation unit 111 may calculate, as the wait time, the sum of backoff times in a case where the SYN packet is retransmitted three times. In this example, the calculated wait time is twenty-one seconds. In this case, the estimation unit 111 determines that a wait time of twenty-one seconds occurs. For example, when a threshold value of the wait time is twenty-five seconds, if the calculated time is twenty-one seconds, the estimation unit 111 determines that communication is enabled.

In the case of performing inspection by using a plurality of communication parameters, the estimation unit 111 may associate the communication parameters with the communication errors transmitted from the detection unit 122, for example, by using identifiers. For example, the estimation unit 111 may associate identifiers with the communication parameters in advance. The estimation unit 111 may associate an identifier with a communication request to be transmitted in the inspection. Then, the estimation unit 111 may transmit an communication request associated with an identifier to the setting unit 121. The detection unit 122 may transmit the communication error associated with the identifier to the estimation unit 111. The identifier may be the communication parameter. The identifier may be an identifier of the communication parameter.

In inspection using a plurality of communication parameters, when performing communication while changing the communication parameters sequentially, a long time is required to complete the whole of the communication.

Therefore, the setting unit 121 may simultaneously perform TCP communications, in which different parameters is set, in a parallel manner. The estimation unit 111 may perform an estimation process every time communication in which a value of the communication parameters is in one setting ends.

The application 110 may control a TCP reconnection from an application level on the basis of the result estimated using the communication error occurrence probability, for example, illustrated in FIG. 2. Repetition of reconnection by the application 110 is different from repetition of retransmission of a SYN packet. Even when the reconnection by the application 110 repeatedly fails, a provided backoff period does not exponentially increase according to the number of failures. In other words, an increase in the provided backoff period in this case is not exponential. For example, when, as a result of estimation, twenty-one seconds are required until the TCP connection is established, the application 110 may perform the TCP reconnection, for example, for each one second. When a response indicating that a session is established is not transmitted from the communication protocol unit 130 within twenty-one seconds after a SYN packet is transmitted by the communication protocol unit 130, the application 110 may consider that session establishment fails. In this case, the application 110 may perform TCP reconnection. In this way, it is possible to establish a TCP connection early.

[Description of Operation]

Next, the operation of the communication state estimation device 10 of the present example embodiment is described in detail with reference to the drawings.

In the present example embodiment, an ad-hoc network may be constructed by a plurality of communication terminals 1. Hereinafter, in order to facilitate a description, communication between two communication terminals 1 of the communication terminals 1 constituting the network is described. Furthermore, in the example described below, TCP is used as a communication protocol.

Figure 3:
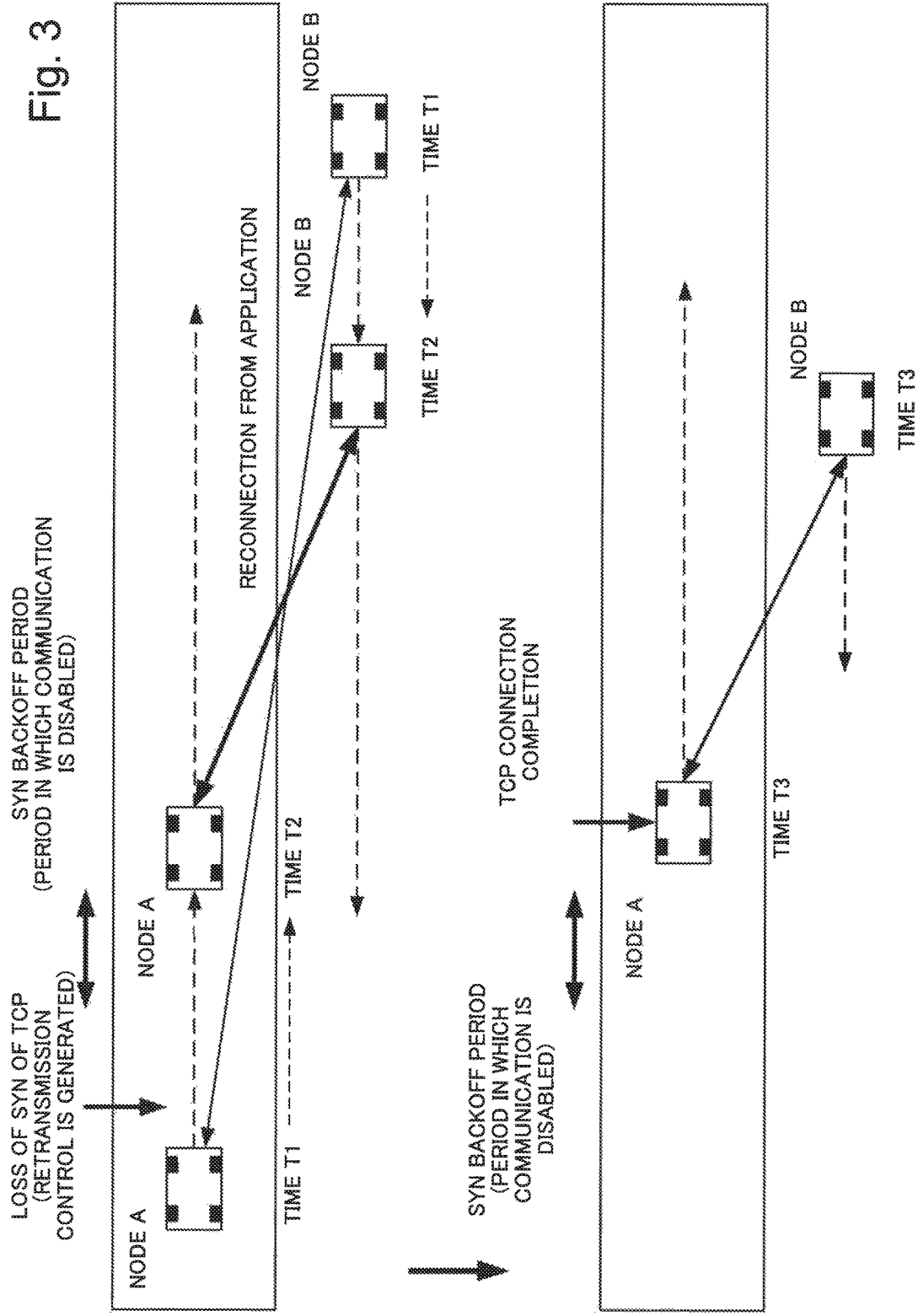
FIG. 3 is a diagram illustrating an example of an arrangement of two communication terminals 1 of the first example embodiment of the present invention.

FIG. 3 is a diagram illustrating an example of an arrangement of two communication terminals 1. In FIG. 3, boxes indicated as a node A and a node B represent the positions of the two communication terminals 1. The two communication terminals 1 are mounted in a movable body such as a running vehicle. In the example illustrated in FIG. 3, a time sequentially lapses in sequence of a time T1, a time T2, and a time T3. The positions of the node A and the node B at the time T1 represent the longest distance at which mutual communication is possible. Furthermore, each of the communication terminals 1 transmits a beacon for notifying its own presence at fixed intervals, thereby notifying the other communication terminal 1, existing in a range where communication is possible, of an Internet Protocol (IP) address. Therefore, each of the communication terminals 1 recognizes the presence (the IP address) of the other communication terminal.

Figure 4:
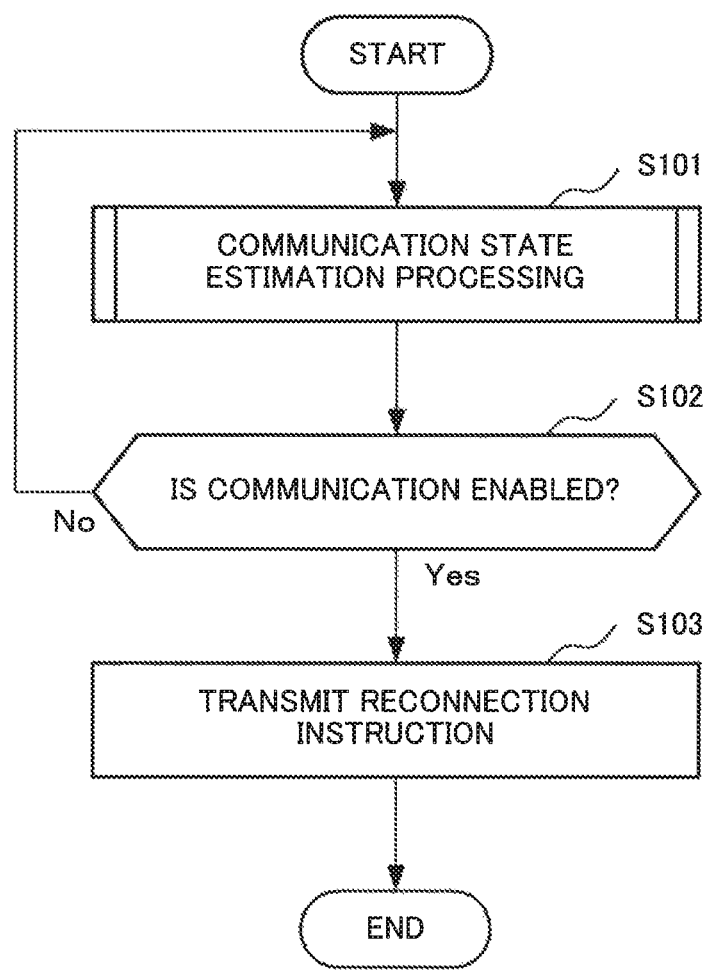
FIG. 4 is a flowchart illustrating a communication establishment operation of a communication state estimation device 10 of the first example embodiment of the present invention.

FIG. 4 is a flowchart illustrating a communication establishment operation of the communication state estimation device 10 of the present example embodiment. When one (for example, the communication terminal 1 represented by the node A) of the aforementioned two communication terminals 1 transmits its own data to the other communication terminal 1 (for example, the communication terminal 1 represented by the node B), communication with the node B is established before the data is transmitted. In the following description, the communication terminal 1 represented by the node A is referred to as the node A or is simply referred to as the communication terminal 1. The communication terminal 1 represented by the node B is referred to as the node B or the communication destination device 2. FIG. 4 illustrates the operation of the communication state estimation device 10 included in the communication terminal 1 indicated as the node A in the case of establishing a connection between the node A and the node B. In the following description, a partner communicating with the communication terminal 1 is the communication destination device 2.

The node A, that is, the communication terminal 1 first detects communication situations. That is, the communication terminal 1 determines, using the estimation unit 111, whether transmitting data by using TCP is enabled (that is, whether or not backoff control occurs). Processing to do this a communication state estimation processing in step S101 illustrated in FIG. 4.

Referring to FIG. 4, the communication state estimation device 10 of the present example embodiment first performs the communication state estimation processing (step S101). The communication state estimation processing is described in detail later. As a result of determination in the communication state estimation processing, when communication is enabled (Yes in step S102), that is, when data transmission is enabled, the estimation unit 111, for example, transmits a reconnection instruction to establish communication for transmitting data to the communication protocol unit 130 of the communication device 11 (step S103). When the communication is disabled (No in step S102), the communication state estimation device 10 may repeat the communication state estimation processing (step S101). In addition, the application 110 may perform an operation of one of or both of step S102 and step S103. Another application program executed by a processor of the communication state estimation device 10 may perform the operation of one of or both of step S102 and step S103. An application program executed by a processor of the communication terminal 1 may perform operation of one of or both of step S102 and step S103.

Next, the operation of the communication state estimation process of the communication state estimation device 10 of the present example embodiment is described in detail with reference to the drawing.

Figure 5:
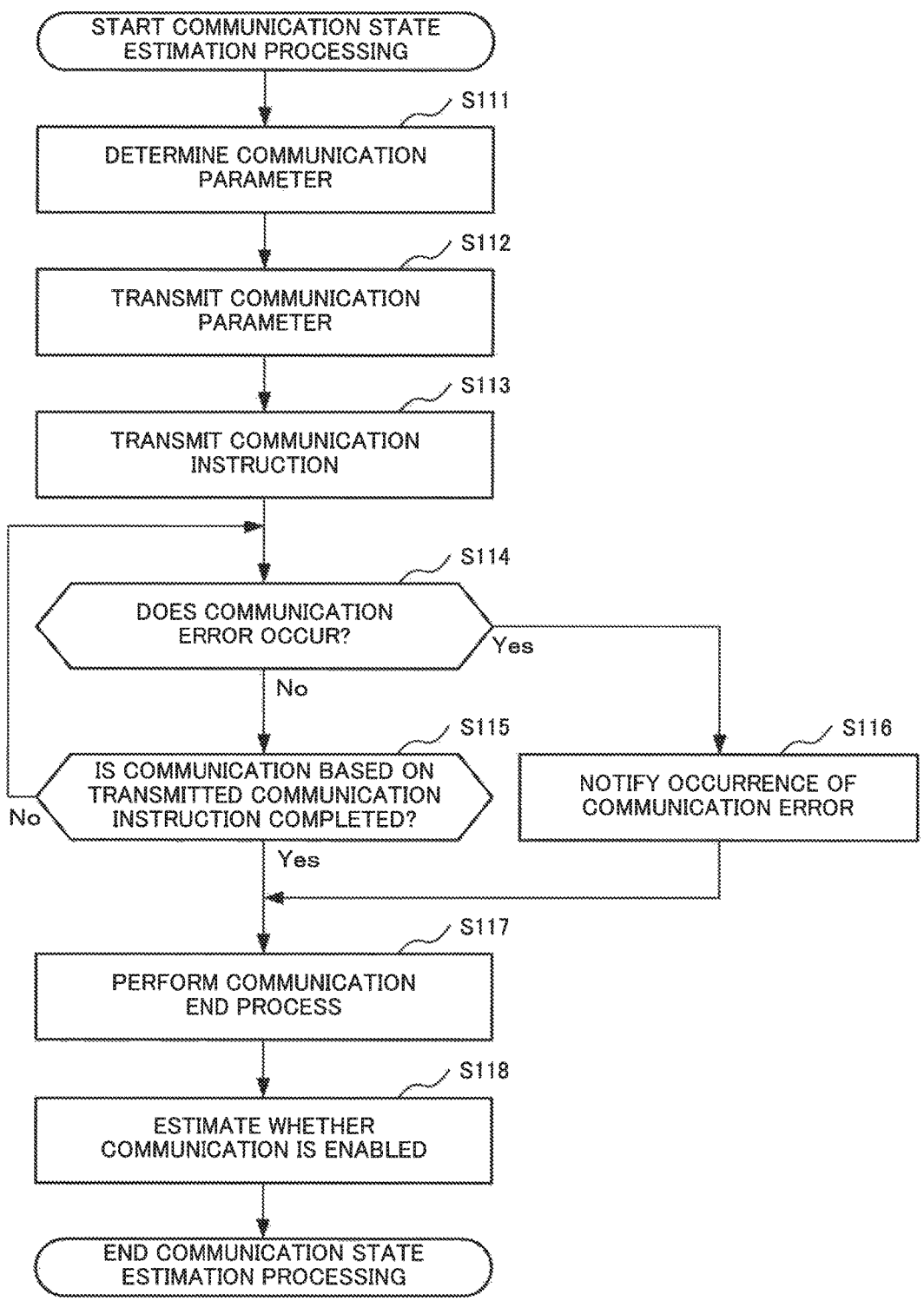
FIG. 5 is a flowchart illustrating an example of a communication state estimation process operation of a communication state estimation device 10 of the first and second example embodiments of the present invention.

FIG. 5 is a flowchart illustrating an example of the operation of the communication state estimation processing of the communication state estimation device 10 of the present example embodiment.

Referring to FIG. 5, first, the estimation unit 111 determines a communication parameter to be used (step S111). In step S111, for a TCP communication test of estimating whether a session can be established without an increase in a backoff time in session establishment, the estimation unit 111 determines, for example, the number of retransmissions of the SYN packet to one. The estimation unit 111 transmits the determined communication parameter to the setting unit 121 (step S112). The estimation unit 111 may transmit an instruction to set the communication parameter to the setting unit 121. The estimation unit 111 transmits, for example, an instruction to set the number of retransmissions of the SYN packet to one to the setting unit 121. In the state in which the determined communication parameter is set, the estimation unit 111 transmits, to the setting unit 121, a communication instruction to perform communication (step S113). The setting unit 121, upon receiving the communication instruction, instructs the communication protocol unit 130 to start TCP communication for communication situation estimation as is described later. The estimation unit 111 transmits, for example, a communication instruction to the setting unit 121 in this manner, thereby instructing the communication protocol unit 130 to start the TCP communication for communication situation estimation.

In step S113, the setting unit 121 assigns the communication parameter (for example, the number of SYN retransmissions: one) transmitted from the estimation unit 111 to the communication protocol unit 130. Then, the setting unit 121 instructs the communication protocol unit 130 to start communication. In the present example embodiment, the setting unit 121 sets the number of retransmissions of the SYN packet of TCP to "one" in the socket option, thereby assigning the communication parameter to the communication protocol unit 130. In step S113, the setting unit 121 instructs the communication protocol unit 130 to start TCP communication.

In step S113, the communication protocol unit 130 starts communication in accordance with the communication parameter set by the setting unit 121. In the present example embodiment, as described above, the number of retransmissions of the SYN packet of TCP is set to "one". The communication protocol unit 130 starts the TCP communication under the condition that the number of retransmissions of the SYN packet of TCP is "one". The communication protocol unit 130 monitors whether a communication error occurs and whether the TCP communication is completed. When the occurrence of a communication error is detected, the communication protocol unit 130 transmits communication error information representing the communication error that is occurred to the detection unit 122. When the communication is normally completed, the communication protocol unit 130 transmits, for example, a response representing completion of the communication to the detection unit 122. In the present example embodiment, this communication corresponds to, for example, transmission of a SYN packet for establishing a session.

When the communication error occurs, the detection unit 122 receives the communication error information representing the occurred communication error from the communication protocol unit 130 (that is, receives the communication error). When the communication error information representing the occurred communication error is received from the communication protocol unit 130 (Yes in step S114), the detection unit 122 notifies the estimation unit 111 of occurrence of a communication error (step S116). The detection unit 122 may transmit the occurred communication error to the estimation unit 111. That is, the detection unit 122 may transmit the communication error information representing the occurred communication error to the estimation unit 111. After the operation of step S116, the detection unit 122 performs a communication end processing (step S117). In step S117, the detection unit 122, for example, may transmit an instruction to end communication to the communication protocol unit 130. The communication protocol unit 130, upon received the instruction to end communication, closes a TCP communication socket, thereby ending the TCP communication.

When the communication error does not occur, the detection unit 122 does not receive the communication error information representing the occurred communication error from the communication protocol unit 130 (that is, does not receive the communication error). When the communication error information representing the occurred communication error is not received from the communication protocol unit 130 (No in step S114), the detection unit 122 determines whether the communication based on the transmission instruction transmitted in step S113 is completed. As a result of determination, when the communication is normally completed (Yes in step S115), the detection unit 122 performs the aforementioned operation of step S117. When the communication error is not received from the communication protocol unit 130 (No in step S114) and a response representing normal completion of communication is not received (No in step S115) from the communication protocol unit 130, the operation of the communication state estimation device 10 returns to step S114. Then, the operations from step S114 to step S115 are repeated until the communication error or the response representing normal completion of communication is received from the communication protocol unit 130.

When the aforementioned inspection is performed for a plurality of times, the communication state estimation device 10 repeats the operations from step S111 to step S117.

Then, the estimation unit 111 estimates whether communication with the communication destination device 2 is enabled (step S118). For example, when session establishment successively succeeds three times, the estimation unit 111 may estimate that the communication with the communication destination device 2 is enabled. A state in which the communication is enabled is, for example, a state in which no communication error occurs in the communication with the communication destination device 2 and data can be transmitted using TCP (that is, a state in which no backoff control occurs, for example). When the estimation unit 111 determines that the communication with the communication destination device 2 is enabled, the communication terminal 1 starts TCP communication in which data transmission is actually performed, for example, by a transmission of connection instruction by the application 110 as described above.

Figure 10:
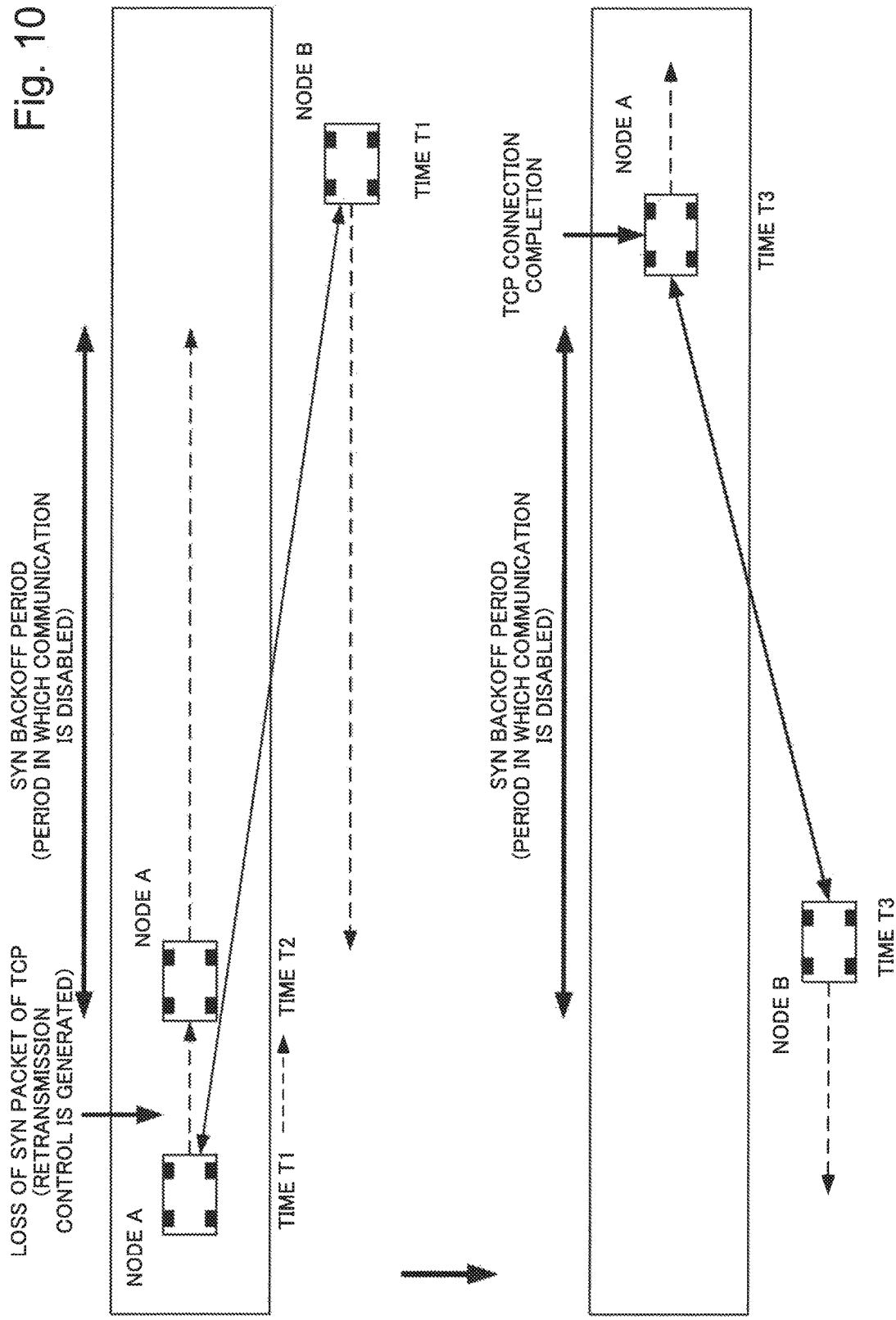
FIG. 10 is a diagram schematically illustrating an example of inter-vehicle communication.
Figure 11:
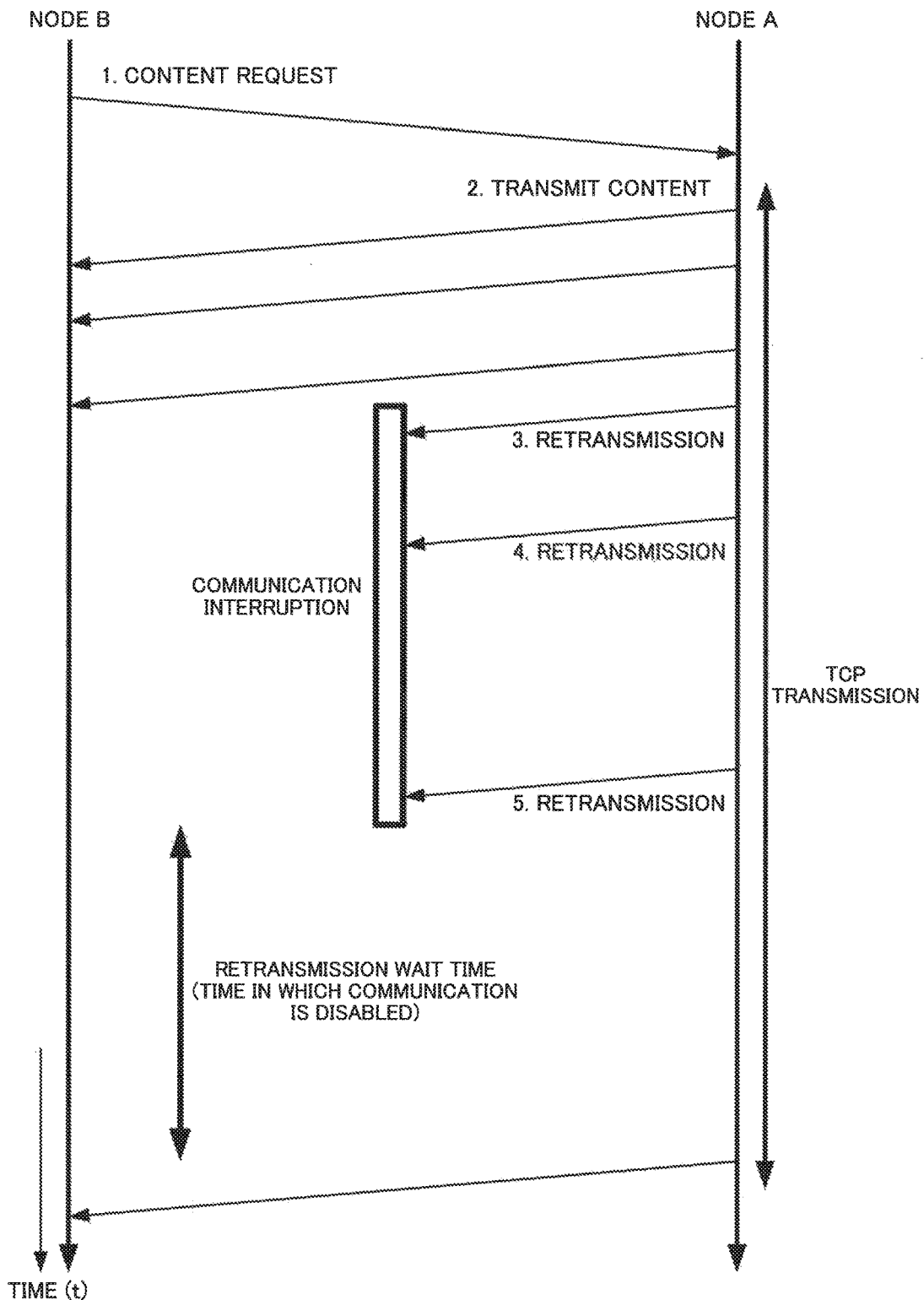
FIG. 11 is a diagram schematically illustrating an example of communication which is performed between two communication terminals.

In the example illustrated in FIG. 3, for example, a reconnection is started at the time T2. At the time T3, the TCP connection is completed. In the example illustrated in FIG. 3, a time until the TCP connection is completed is short as compared with the example illustrated in FIG. 10. Accordingly, for the node A and the node B of FIG. 3, a time in which communication is enabled is long as compared with the example illustrated in FIG. 10. The times T1, T2, and T3 illustrated in FIG. 3 are not related with the times T1, T2, and T3 illustrated in FIG. 10.

In the above description, the communication state estimation device 10 estimates communication states by dedicated TCP communication which is used only for communication state estimation. The communication state estimation device 10 may estimate the communication states by using TCP communication in which data transmission is performed. In detail, the communication state estimation device 10 may set communication parameters as communication parameters to be used in a test and then start data communication. At the time when determining that a communication error is not detected, the communication terminal 1 may return a communication parameter to the communication parameter which is set at the time of data transmission. Then, the communication terminal 1 may perform the data transmission.

The present example embodiment described above has an effect that it is capable of improving accuracy in specifying a state of a network. The reason for this is that the estimation unit 111 determines, on the basis of a communication parameter and the presence or absence of a communication error for the communication parameter, whether the communication device 11 can perform communication. The communication parameter is assign to the communication protocol unit 130 of the communication device 11 by the setting unit 121. The communication error is detected by the detection unit 122 in communication performed by the communication device 11 to which the communication parameter is assigned.

Second Example Embodiment

[Description of Configuration]

Next, a second example embodiment of the present invention is described in detail with reference to the drawings. The present example embodiment is an example embodiment based on the first example embodiment.

FIG. 1 is a block diagram illustrating an example of a configuration of a communication terminal 1 of the present example embodiment. The configuration of the communication terminal 1 of the present example embodiment is the same as that of the communication terminal 1 of the first example embodiment. In the following description, features according to the present example embodiment is mainly described. A redundant description for a configuration similar to that of the aforementioned first example embodiment is omitted.

A communication state estimation device 10 of the present example embodiment estimates communication situations in data communication after a TCP session is established, on the basis of the fact that no packet flows for a certain period of time. The communication state estimation device 10 of the present example embodiment may further perform operations similar to those of the communication state estimation device 10 of the first example embodiment. That is, the communication state estimation device 10 of the present example embodiment may further determine whether data communication can be started, on the basis of the number of retransmissions of the SYN packet of TCP communication and a communication error detected in session establishment of the TCP communication.

The estimation unit 111 determines communication parameters to be assigned to a communication protocol unit 130 similarly to the estimation unit 111 of the first example embodiment. Moreover, on the basis of the determined communication parameter and the presence or absence of a communication error occurring in communication in which the communication parameter is set, the estimation unit 111 estimates communication states.

For example, when a communication state (for example, the presence or absence of the occurrence of backoff in packet retransmission) of an established TCP communication session is an inspection target, the estimation unit 111, for example, determines a communication interruption allowable time for which interruption of communication is allowable. Then, the estimation unit 111 transmits the determined time for which interruption of communication is allowable to a setting unit 121 as a communication parameter to be assigned to a communication device 11. Moreover, the estimation unit 111 transmits a communication instruction, which is a request to perform communication, to the setting unit 121. The estimation unit 111 receives from the detection unit 122, a communication error, which occurs in communication performed in the state in which the transmitted communication parameter is set, from the detection unit 122. On the basis of the received communication error, the estimation unit 111 detects a communication state such as a packet transmission state. A parameter representing the time for which interruption of communication is allowable may be, for example, TCP_USER_TIMEOUT. In the following description, the time for which interruption of communication is allowable is 10 seconds.

For example, in the case where the communication interruption allowable time is set to 10 seconds, when communication interruption of 10 seconds or more occurs in the communication performed in response to the transmitted communication instruction, a communication error is transmitted from the detection unit 122. When the communication error is received from the detection unit 122 within, for example, a certain period of time, the estimation unit 111 determines that communication interruption of 10 seconds or more occurs. In contrast, when no communication error is received from the detection unit 122 within the certain period of time, the estimation unit 111 determines that there is no communication interruption of 10 seconds or more. The estimation unit 111 may repeat transmission of a communication instruction. For example, when no communication error is successively received three times or more, it may determine that the communication interruption of 10 seconds or more does not occur.

The estimation unit 111 may repeat the inspection while changing a communication parameter to a different communication parameter. The estimation unit 111 may repeated the inspection using a specific communication parameter. When the occurrence of a communication error in communication using a certain communication parameter is not detected, the estimation unit 111 may further perform the inspection using a communication parameter with which an error is easy to occur. For example, when determining that communication interruption of 10 seconds or more does not occur, the estimation unit 111 may change the time for which interruption of communication is allowable to 5 seconds. The estimation unit 111, for example, may change the TCP_USER_TIMEOUT to 5 seconds. Then, the estimation unit 111 may transmit a communication instruction again. The estimation unit 111 can perform the inspection using a plurality of different communication parameters, thereby more exactly detecting the length of a time of communication interruption which will occur.

Furthermore, the estimation unit 111 can detect a communication interruption time by using a maximum value of the number of packet retransmissions. For example, in communication in which the maximum value of the number of packet retransmissions is set as a communication parameter, when the number of packet retransmissions exceeds the number of times set as the maximum value of the number of packet retransmissions, the generation of communication error information is detected. The estimation unit 111 may estimate, as a time for which communication stops, the sum of backoff times determined for the number of times set as the maximum value for a packet. The estimation unit 111, for example, may repeat the inspection while variously changing the maximum value of the number of packet retransmissions, thereby estimating the communication interruption time more accurately. In general, the sum of the backoff times is not proportional to the number of packet retransmissions. A backoff time set in one packet retransmission, for example, exponentially increases according to an increase in the number of retransmissions, for example, as the example illustrated in FIG. 2. The estimation unit 111 may hold backoff times set in packet retransmission separately for the numbers of times of packet retransmissions. Furthermore, the estimation unit 111 may calculate the sum of backoff times, which are determined for the maximum value of the number of packet retransmissions set as a communication parameter. The estimation unit 111 may determine that the calculated sum of backoff times is the time for which communication stops. In the example illustrated in FIG. 2, for example, when the number of times set as the maximum value of the number of packet retransmissions is one, a time determined as the communication interruption time is three seconds. When the number of times set as the maximum value of the number of packet retransmissions is two, the estimation unit 111 may determine that the communication interruption time is nine seconds which is the sum of three seconds that is a backoff period in the first retransmission and six seconds that is a backoff period in the second retransmission.

When performing the inspection separately using a plurality of communication parameters, the estimation unit 111 may use an identifier similarly to the estimation unit 111 of the first example embodiment, thereby associating the communication parameters with the communication errors from the detection unit 122.

Similarly to the detection unit 122 of the first example embodiment, when a communication error occurs, the detection unit 122 notifies the estimation unit 111 of the occurred communication error. The detection unit 122 may transmit information representing the occurred communication error to the estimation unit 111. As described above, the detection unit 122, for example, may change the TCP_USER_TIMEOUT, thereby setting a communication parameter. For example, after a session is established, when a communication error is detected in communication performed by the communication protocol unit 130, the detection unit 122 may notify the estimation unit 111 that no packet is received within the period of time set as a communication parameter.

When using other communication parameters, the detection unit 122 may notify the estimation unit 111 of information indicating the communication error in the same manner.

[Description of Operation]

Next, the operation of the communication state estimation device 10 of the present example embodiment is described in detail with reference to the drawings.

In the present example embodiment, an ad-hoc network may be constructed using a plurality of communication terminals 1. In the following description, in order to facilitate a description, communication between two communication terminals 1 of the communication terminals 1 constituting the network is described. Furthermore, in the example to be described below, TCP is used as a communication protocol.

Figure 6:
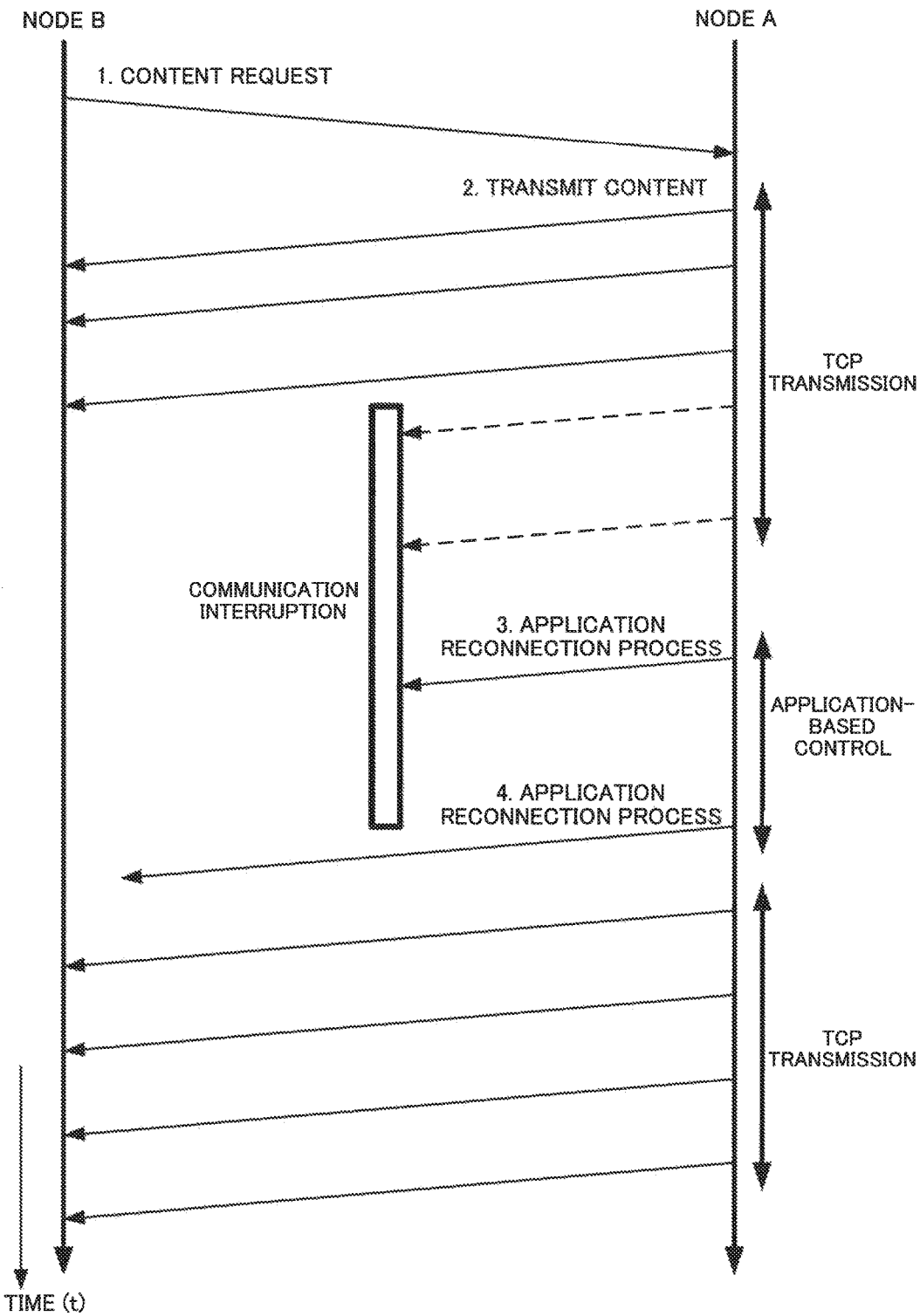
FIG. 6 is a diagram schematically illustrating communication which is performed between two communication terminals 1 in the second example embodiment of the present invention.

FIG. 6 is a diagram schematically illustrating communication performed between the two communication terminals 1 in the present example embodiment. The node A and the node B illustrated in FIG. 6 correspond to the aforementioned two communication terminals 1. A distance between the node A and the node B is within a distance in which the node A and the node B can communicate with each other. Furthermore, each of the communication terminal 1 transmits a beacon for notifying its own presence at fixed intervals, thereby notifying an IP address. Accordingly, each communication terminal 1 detects the presence of the other communication terminal 1. In other words, each of the communication terminal is detects the IP address of the other communication terminal 1.

Figure 7:
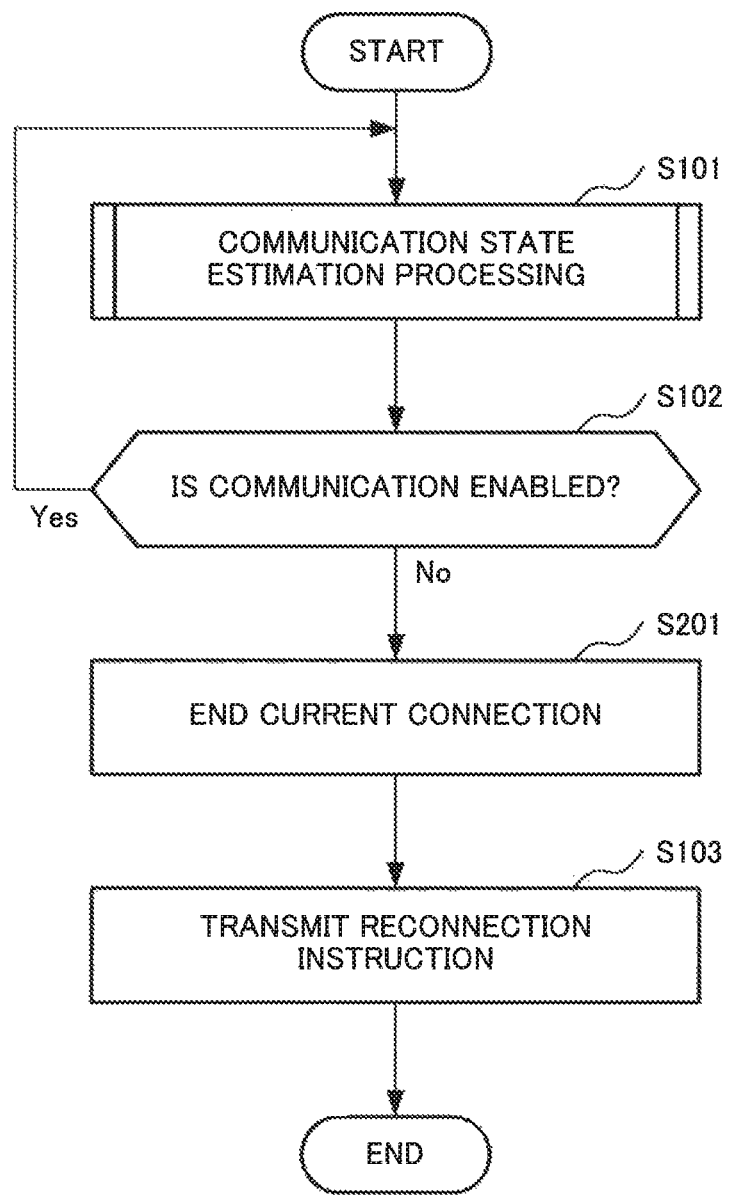
FIG. 7 is a flowchart illustrating an example of an operation of the communication state estimation device 10 of the second example embodiment of the present invention.

FIG. 7 is a flowchart illustrating an example of an operation of the communication state estimation device 10 of the present example embodiment. In the operation illustrated in FIG. 7, communication between the node A and the node B is already established. For example, the node A transmits its own data to the node B. In FIG. 6, operations performed by the node A and the node B are drawn downward from the top according to the passage of time. In the example illustrated in FIG. 6, the node A, for example, transmits content in response to a content request from the node B. Then, the node A performs the operation illustrated in FIG. 7 while transmitting data to the node B. Specifically, the communication state estimation device 10 included in the node A performs the operation illustrated in FIG. 7. In the following description, the communication terminal 1 indicated as the node A in FIG. 6 is referred to as the node A or is simply referred to as a communication terminal 1. The communication terminal 1 indicated as the node B in FIG. 6 is referred to as the node B or the communication destination device 2.

Referring to FIG. 7, the communication state estimation device 10 of the communication terminal 1 first performs a communication state estimation processing (step S101). That is, the communication state estimation device 10 of the communication terminal 1 determines, by the estimation unit 111, whether data communication can be performed using TCP (that is, whether retransmission backoff control is performed). The communication state estimation processing of step S101 is described in detail later.

When communication is determined to be enabled in the communication state estimation processing (Yes in step S102), the communication state estimation device 10 repeats the communication state estimation processing of step S101. As described later, in the communication state estimation processing, data transmission to the communication destination device 2 is performed. That is, the data transmission to the communication destination device 2 is continued.

When communication is determined not be enabled in the communication state estimation processing (No in step S102), the estimation unit 111, for example, ends a current connection (step S201). The estimation unit 111, for example, may transmit a communication end instruction, which is an instruction to close a TCP session, to the communication protocol unit 130 of the communication device 11. The communication protocol unit 130, upon receiving the communication end instruction, ends the established communication. Moreover, the estimation unit 111 transmits a reconnection instruction, which is an instruction to perform a reconnection, to the communication protocol unit 130 of the communication device 11 (step S103). The communication protocol unit 130, upon receiving the reconnection instruction, newly starts TCP communication. The data transmission performed by the communication terminal 1 is performed via the newly started TCP communication. In addition, the application 110 may perform the whole or a part of the operations of step S102, step S201 and step S103. Another application program executed by a processor of the communication state estimation device 10 may perform the whole or a part of the operations of step S102, step S201 and step S103. An application program executed by a processor of the communication terminal 1 may perform the whole or a part of the operations of step S102, step S201 and step S103.

Next, the operation of the communication terminal 1 of the present example embodiment performing the communication state estimation processing is described in detail with reference to the drawing.

FIG. 5 is a flowchart illustrating an example of the operation of the communication terminal 1, performing the communication state estimation process, of the present example embodiment. In the communication state estimation processing of the present example embodiment illustrated in FIG. 5, it is estimated whether TCP communication is stopped on the basis of, for example, the length of a backoff time in packet retransmission.

First, the estimation unit 111 determines a communication parameter (step S111). The communication parameter determined in step S111 is a communication parameter to be used to estimate whether TCP communication stops for a predetermined time or more. The estimation unit 111, for example, may determine a value of a time of communication timeout, that is, a value of a time for which communication interruption is allowable. The estimation unit 111 determines the time for which communication interruption is allowable time, for example, to ten seconds. Next, the estimation unit 111 transmits the determined communication parameter to the setting unit 121 (step S112). The estimation unit 111 may transmit, to the setting unit 121, for example, an instruction to set communication timeout to ten seconds determined as the time for which communication interruption is allowable. Moreover, the estimation unit 111 transmits a communication instruction, which is an instruction to perform TCP communication in the state in which the determined communication parameter is set, to the setting unit 121 (step S113).

In step S112, the setting unit 121 assigns the communication parameter received from the estimation unit 111 to the communication protocol unit 130. In the aforementioned example, the setting unit 121, for example, may set the TCP_USER_TIMEOUT to ten seconds in the socket option, thereby setting the communication parameter. In step S113, the setting unit 121 transmits, to the communication protocol unit 130, an instruction to start communication. The communication protocol unit 130 starts communication. Data to be transmitted to the communication destination device 2 from the communication protocol unit 130 may be data to be used only in an examination. In the present example embodiment, the data transmitted to the communication destination device 2 from the communication protocol unit 130 by the operation of step S113 may be the aforementioned data transmitted to the communication destination device 2 from the communication terminal 1.

Operations from step S114 to step S118 are similar to those from step S114 to step S118 in the first example embodiment. In the present example embodiment, the communication parameter, for example, may be the time for which communication interruption is allowable. The communication error may be, for example, an error that no data transmission is performed for a time equal to or more than the time for which communication interruption is allowable.

As described above, the operations illustrated in FIG. 5 are performed in parallel to data transmission from the communication terminal 1 to the communication destination device 2. By the operations illustrated in FIG. 5, the communication state estimation device 10 monitors whether interruption (for example, a long retransmission backoff time that occurs due to packet retransmission) of TCP data transmission to the communication destination device 2 occurs.

In a case where the estimation unit 111 estimates that communication interruption occurs, there is a probability that the communication interruption illustrated in FIG. 6, which occurs due to packet retransmission and the like, has occurred in communication between the communication terminal 1 and the communication destination device 2. In this case, the estimation unit 111, the application 110 and the like may stop TCP communication that is established. Then, the estimation unit 111, the application 110 and the like perform reconnection processing of newly starting TCP communication. In this way, as illustrated in FIG. 6, the TCP communication can be restarted early. Accordingly, a wait time is reduced. In the example illustrated in FIG. 6, the "TCP communication" means communication according to TCP, which is controlled by the communication protocol unit 130 conforming to TCP. The "application-based control" means processing which is performed by, for example, an application program executed by a processor of the communication terminal 1 and the like. The "application reconnection process" means reconnection processing which is performed by, for example, an application program executed by the processor of the communication terminal 1 and the like. Repetition of the application reconnection process is not repetition of packet retransmission. Accordingly, in the application reconnection process, even though a reconnection repeatedly fails, a set backoff period does not exponentially increase. In other words, in this case, an increase in the set backoff period is not exponential.

In the above description, dedicated TCP communication for communication state estimation is used. The communication state estimation may be performed using TCP communication in which actual data is transmitted. In detail, the estimation unit 111 may determine a communication parameter used in an examination as a communication parameter when data is transmitted. In the state in which the determined communication parameter is set, the setting unit 121 may cause data transmission to be started. At the time at which the occurrence of a communication error is detected, the application 110 and the like may restart the TCP communication. Furthermore, an application and the like performing data transmission may restart transmission of data, transmission of which has been stopped by the communication error.

The present example embodiment described above has the same effects as those of the first example embodiment. The reason is the same as that by which the effects of the first example embodiment are obtained.

Third Example Embodiment

Next, a communication state estimation device 10 of a third example embodiment of the present invention is described in detail with reference to the drawing. The present example embodiment is an example embodiment representing a concept common in the aforementioned respective example embodiments.

Figure 8:
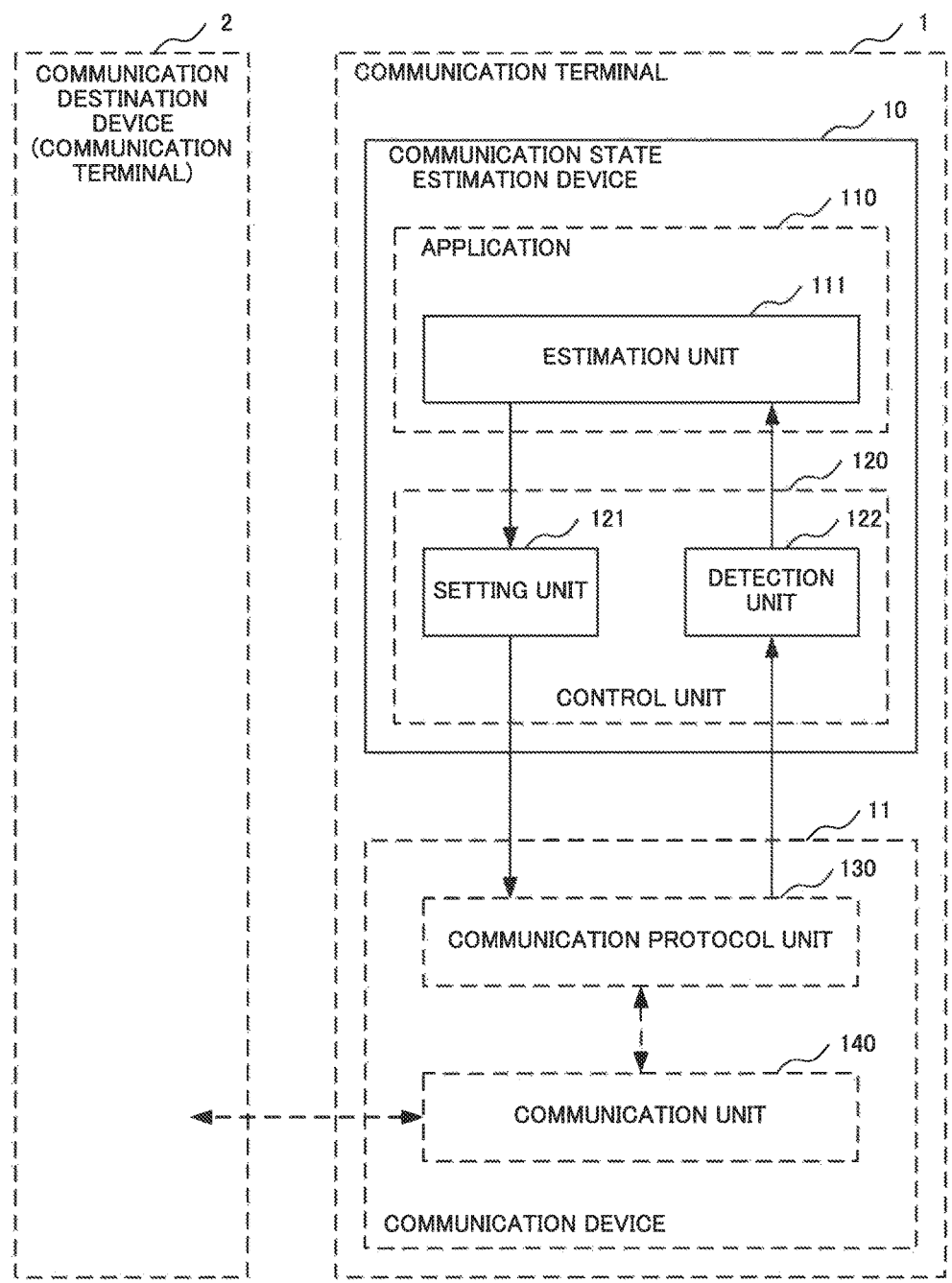
FIG. 8 is a block diagram illustrating an example of a configuration of a communication state estimation device 10 of a third example embodiment of the present invention.

FIG. 8 is a block diagram illustrating an example of a configuration of the communication state estimation device 10 of the present example embodiment.

Referring to FIG. 8, the communication state estimation device 10 of the present example embodiment includes a setting unit 121, a detection unit 122, and an estimation unit 111. The setting unit 121 assigns the aforementioned communication parameter to a communication device 11, which determines the occurrence of a communication error in communication with a communication destination device 2, based on the assigned communication parameter. The detection unit 122 transmits the aforementioned communication instruction to the communication device 11, which performs the aforementioned communication upon reception of the communication instruction, and detects the occurrence of a communication error determined in the aforementioned communication performed in response to the instruction. On the basis of the aforementioned communication parameter and the presence or absence of the occurrence of the aforementioned communication error, the estimation unit 111 estimates whether the communication device 11 is capable of performing the aforementioned communication.

The present example embodiment described above has the same effects as those of the first example embodiment. The reason is the same as that by which the effects of the first example embodiment are obtained.

Other Example Embodiments

A communication terminal 1 and a communication state estimation device 10 each can be realized by a computer and a program for controlling the computer, dedicated hardware, or a combination of a computer and a program for controlling the computer and dedicated hardware.

Figure 9:
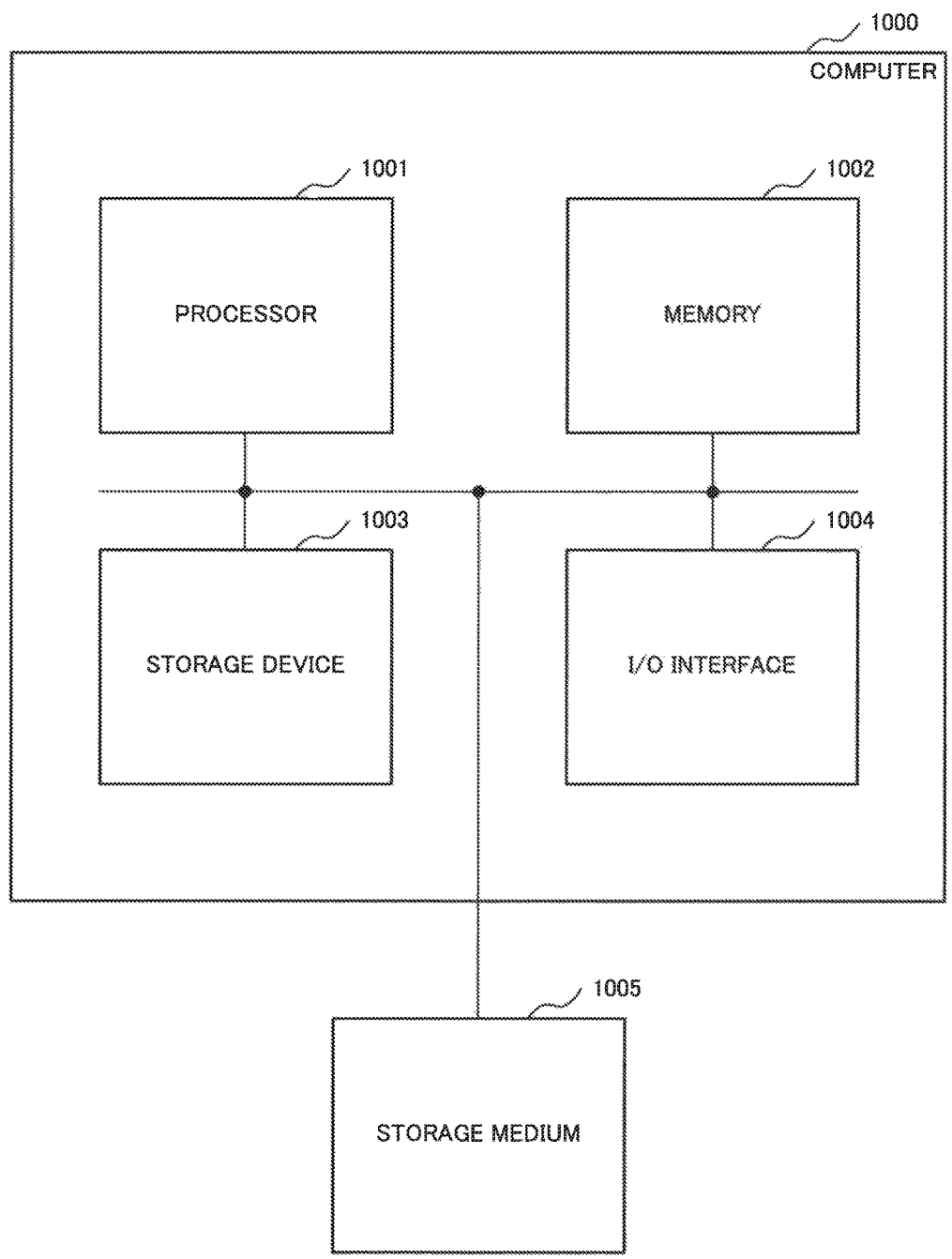
FIG. 9 is a diagram illustrating an example of a hardware configuration of a computer 1000, which can realize a communication terminal 1 and a communication state estimation device 10 according to one of example embodiments of the present invention.

FIG. 9 is a diagram illustrating an example of a hardware configuration of a computer 1000 capable of realizing the communication terminal 1 and the communication state estimation device 10. Referring to FIG. 9, the computer 1000 includes a processor 1001, a memory 1002, a storage device 1003, and an Input/Output (I/O) interface 1004. The computer 1000 can access a storage medium 1005. The memory 1002 and the storage device 1003, for example, are storage devices such as RAM (Random Access Memory) and a hard disk. The storage medium 1005, for example, is a storage device such as RAM and a hard disk, ROM (Read Only Memory), and a portable storage medium. The storage device 1003 may be the storage medium 1005. The processor 1001 can perform reading and writing of data and programs from/to the memory 1002 and the storage device 1003. The processor 1001 can access, for example, a communication destination device 2 or a communication device 11 via the I/O interface 1004. The processor 1001 can access the storage medium 1005. The storage medium 1005 stores a program causing the computer 1000 to operate as the communication terminal 1 or the communication state estimation device 10.

The processor 1001 loads, into the memory 1002, the program stored in the storage medium 1005 and causing the computer 1000 to operate as the communication terminal 1 or the communication state estimation device 10. Then, the processor 1001 executes the program loaded into the memory 1002, so that the computer 1000 operates as the communication terminal 1 or the communication state estimation device 10.

The estimation unit 111, the setting unit 121, the detection unit 122, the communication protocol unit 130, and the communication unit 140 can be realized, for example, by dedicated programs capable of performing functions of these units, and the processor 1001 for executing the programs. In this case, the dedicated programs, for example, are read into the memory 1002 from the storage medium 1005 that stores the dedicated programs. Alternatively, the whole or a part of the estimation unit 111, the setting unit 121, the detection unit 122, the communication protocol unit 130, and the communication unit 140 can also be realized by dedicated circuits for performing the functions of these units.

Furthermore, the whole or a part of the aforementioned example embodiments are also described as the following supplementary notes, but are not limited thereto.

(Supplementary Note 1)

A communication state estimation device including:

setting means for assigning a communication parameter to a communication device that determines occurrence of a communication error in communication with a communication destination device based on the communication parameter assigned;

detection means for transmitting a communication instruction to the communication device that performs the communication upon reception of the communication instruction, and detecting occurrence of a communication error determined in the communication that is performed in response to the instruction; and estimation means for estimating whether the communication device is able to perform the communication, on a basis of the communication parameter and presence or absence of the occurrence of the communication error.

(Supplementary Note 2)

The communication state estimation device according to Supplementary Note 1, wherein the estimation means estimates a time until the communication is able to be performed, on the basis of the communication parameter and the presence or absence of the occurrence of the communication error, and estimates whether the communication device is able to perform the communication on a basis of the time estimated.

(Supplementary Note 3)

The communication state estimation device according to Supplementary Note 1 or 2, wherein the setting means transmits a plurality of communication parameters to the communication device, the plurality of communication parameters being different from each other, and the detection means detects the occurrence of the communication error determined based on the communication parameter for each of the plurality of communication parameters.

(Supplementary Note 4)

The communication state estimation device according to any one of Supplementary Notes 1 to 3, wherein, when the communication device is estimated not to be able to perform the communication, the setting means transmits a reconnection instruction to the communication device that reconnects to the communication destination device upon reception of the reconnection instruction.

(Supplementary Note 5)

The communication state estimation device according to any one of Supplementary Notes 1 to 4, wherein the communication includes communication to establish a connection with the communication destination terminal.

(Supplementary Note 6)

The communication state estimation device according to any one of Supplementary Notes 1 to 5, wherein the communication includes communication to transmit or receive data.

(Supplementary Note 7)

The communication state estimation device according to any one of Supplementary Notes 1 to 6, wherein the communication parameter is a retransmission number of data.

(Supplementary Note 8)

The communication state estimation device according to Supplementary Note 6, wherein the communication parameter is a time for which communication stops.

(Supplementary Note 9)

A communication terminal including:

the communication state estimation device according to any one of Supplementary Notes 1 to 8; and the communication device.

(Supplementary Note 10)

A communication state estimation method including:

assigning a communication parameter to a communication device that determines occurrence of a communication error in communication with a communication destination device based on the communication parameter assigned;

transmitting a communication instruction to the communication device that performs the communication upon reception of the communication instruction, and detecting occurrence of a communication error determined in the communication that is performed in response to the instruction; and estimating whether the communication device is able to perform the communication, on a basis of the communication parameter and presence or absence of the occurrence of the communication error.

(Supplementary Note 11)

The communication state estimation method according to Supplementary Note 10, including:

estimating a time until the communication is able to be performed, on the basis of the communication parameter and the presence or absence of the occurrence of the communication error, and estimating whether the communication device is able to perform the communication on a basis of the time estimated.

(Supplementary Note 12)

The communication state estimation method according to Supplementary Note 10 or 11, including:

transmitting a plurality of communication parameters to the communication device, the plurality of communication parameters being different from each other; and detecting the occurrence of the communication error determined based on the communication parameter for each of the plurality of communication parameters.

(Supplementary Note 13)

The communication state estimation method according to any one of Supplementary Notes 10 to 12, including:

transmitting, when the communication device is estimated not to be able to perform the communication, a reconnection instruction to the communication device that reconnects to the communication destination device upon reception of the reconnection instruction.

(Supplementary Note 14)

The communication state estimation method according to any one of Supplementary Notes 10 to 13, wherein the communication includes communication to establish a connection with the communication destination terminal.

(Supplementary Note 15)

The communication state estimation method according to any one of Supplementary Notes 10 to 14, wherein the communication includes communication to transmit or receive data.

(Supplementary Note 16)

The communication state estimation method according to any one of Supplementary Notes 10 to 15, wherein the communication parameter is a retransmission number of data.

(Supplementary Note 17)

The communication state estimation method according to Supplementary Note 15, wherein the communication parameter is a time for which communication stops.

(Supplementary Note 18)

A communication state estimation program causing a computer to operate as:

setting means for assigning a communication parameter to a communication device that determines occurrence of a communication error in communication with a communication destination device based on the communication parameter assigned;

detection means for transmitting a communication instruction to the communication device that performs the communication upon reception of the communication instruction, and detecting occurrence of a communication error determined in the communication that is performed in response to the instruction; and estimation means for performing estimation whether the communication device is able to perform the communication, on a basis of the communication parameter and presence or absence of the occurrence of the communication error.

(Supplementary Note 19)

The communication state estimation program according to Supplementary Note 18, storing a communication state estimation program, wherein the estimation is performed on a basis of a time predicted as a time until the communication is able to be performed on the basis of the communication parameter and the presence or absence of the occurrence of the communication error.

(Supplementary Note 20)

The communication state estimation program according to Supplementary Note 18 or 19, wherein the setting means transmits a plurality of communication parameters to the communication device, the plurality of communication parameters being different from each other, and the detection means detects the occurrence of the communication error determined based on the communication parameter for each of the plurality of communication parameters.

(Supplementary Note 21)

The communication state estimation program according to any one of Supplementary Notes 18 to 20, wherein, when the communication device is estimated not to be able to perform the communication, the setting means transmits a reconnection instruction to the communication device that reconnects to the communication destination device upon reception of the reconnection instruction.

(Supplementary Note 22)

The communication state estimation program according to any one of Supplementary Notes 18 to 21, wherein the communication includes communication to establish a connection with the communication destination terminal.

(Supplementary Note 23)

The communication state estimation program according to any one of Supplementary Notes 18 to 22, wherein the communication includes communication to transmit or receive data.

(Supplementary Note 24)

The communication state estimation program according to any one of Supplementary Notes 18 to 23, wherein the communication parameter is a retransmission number of data.

(Supplementary Note 25)

The communication state estimation program according to Supplementary Note 23, wherein the communication parameter is a time for which communication stops.

While the present invention is described above with reference to exemplary embodiments, the present invention is not limited to the aforementioned exemplary embodiments. Various modifications which can be understood by a person skilled in the art can be made in the configuration and details of the present invention within the scope of the present invention.

This application claims priority based on Japanese Patent Application No. 2014-124982 filed on Jun. 18, 2014, the content of which is incorporated herein in its entirety by reference.

REFERENCE SIGNS LIST 1 communication terminal
2 communication destination device 10 communication state estimation device
11 communication device
110 application
111 estimation unit
120 control unit
121 setting unit
122 detection unit
130 communication protocol unit
140 communication unit
1000 computer
1001 processor
1002 memory
1003 storage device
1004 I/O interface
1005 storage medium

The invention claimed is:

1. A communication state estimation device comprising:
a memory storing instructions; and
at least one processor coupled to the memory, the at least one processor being operative with the set of instructions in order to:
assign a communication parameter to a communication device that determines occurrence of a communication error in communication with a communication destination device based on the communication parameter assigned;
transmit a communication instruction to the communication device that performs the communication upon reception of the communication instruction, and detect occurrence of a communication error determined in the communication that is performed in response to the communication instruction;
estimate whether the communication device is able to perform the communication, on a basis of the communication parameter and presence or absence of the occurrence of the communication error; and
estimate a time until the communication is able to be performed, on the basis of the communication parameter and the presence or absence of the occurrence of the communication error, and estimate whether the communication device is able to perform the communication on a basis of the time estimated.

2. The communication state estimation device according to claim 1, wherein
the at least one processor is further operative with the instructions to:
transmit a plurality of communication parameters to the communication device, the plurality of communication parameters being different from each other, and
detect the occurrence of the communication error determined based on the communication parameter for each of the plurality of communication parameters.

3. The communication state estimation device according to claim 1, wherein
the at least one processor is further operative with the instructions to:
transmit, when the communication device is estimated not to be able to perform the communication, a reconnection instruction to the communication device that reconnects to the communication destination device upon reception of the reconnection instruction.

4. The communication state estimation device according to claim 1, wherein
the communication includes communication to establish a connection with the communication destination device.

5. The communication state estimation device according to claim 1, wherein
the communication includes communication to transmit or receive data.

6. A communication terminal comprising:
the communication state estimation device according to claim 1; and
the communication device.

7. A communication state estimation method comprising:
assigning a communication parameter to a communication device that determines occurrence of a communication error in communication with a communication destination device based on the communication parameter assigned;
transmitting a communication instruction to the communication device that performs the communication upon reception of the communication instruction, and detecting occurrence of a communication error determined in the communication that is performed in response to the communication instruction;
estimating whether the communication device is able to perform the communication, on a basis of the communication parameter and presence or absence of the occurrence of the communication error; and
estimating a time until the communication is able to be performed, on the basis of the communication parameter and the presence or absence of the occurrence of the communication error, and estimate whether the communication device is able to perform the communication on a basis of the time estimated.

8. A non-transitory computer-readable storage medium that stores a communication state estimation program causing a computer to execute:
setting processing of assigning a communication parameter to a communication device that determines occurrence of a communication error in communication with a communication destination device based on the communication parameter assigned;
detection processing of transmitting a communication instruction to the communication device that performs the communication upon reception of the communication instruction, and detecting occurrence of a communication error determined in the communication that is performed in response to the communication instruction; and
estimation processing of performing estimation whether the communication device is able to perform the communication, on a basis of the communication parameter and presence or absence of the occurrence of the communication error,
wherein the estimation is performed on a basis of a time predicted as a time until the communication is able to be performed on the basis of the communication parameter and the presence or absence of the occurrence of the communication error.

* * * * *